Jan. 18, 1955     F. A. JAMISON     2,699,713
COMBINATION CULTIVATOR, CHOPPER AND WEEDER
Filed April 18, 1950     2 Sheets-Sheet 1

INVENTOR.
Fred A. Jamison
BY
McMorrow, Berman & Davidson
Attorneys

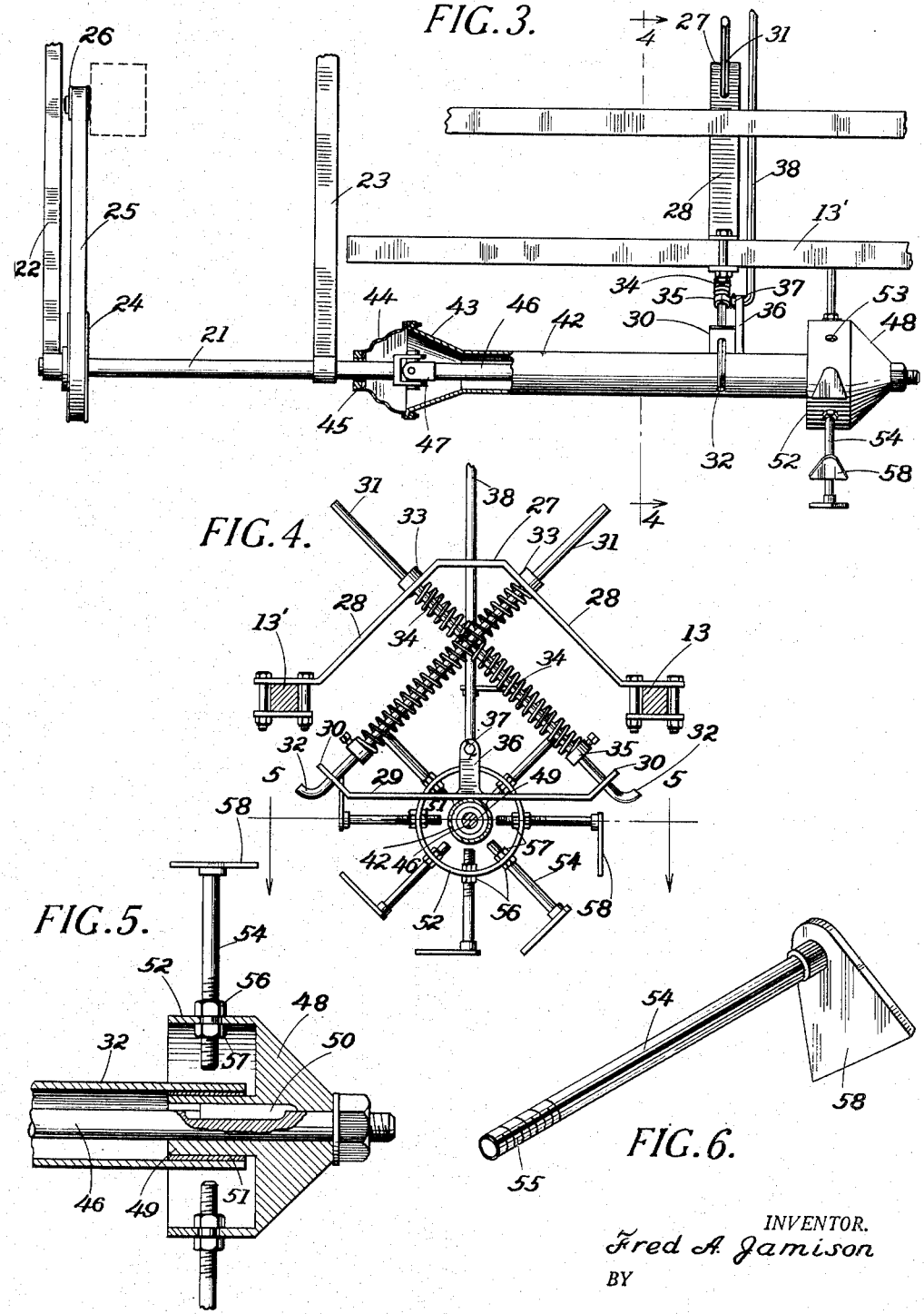

United States Patent Office 2,699,713
Patented Jan. 18, 1955

2,699,713

COMBINATION CULTIVATOR, CHOPPER, AND WEEDER

Fred A. Jamison, Fresno, Calif.

Application April 18, 1950, Serial No. 156,685

2 Claims. (Cl. 97—15)

This invention relates to agricultural implements and more particularly to a chopper attachment for use on a tractor in conjunction with a cultivator carried on the tractor.

A main object of the invention is to provide a novel and improved chopper attachment for use in cultivating row crops, such as cotton, said attachment being very simple in construction, being easy to install on a tractor, and operating in conjunction with a cultivator in a manner to prevent the excessive drying out of cultivated plants during the cultivation thereof, and greatly reducing the labor involved in weeding and thinning row crops, such as cotton plants.

A further object of the invention is to provide an improved chopper attachment for use on a tractor in conjunction with the cultivating apparatus carried by the tractor, said attachment involving only a few parts, being rugged in construction, being readily adjustable to provide a desired width of cut, and which may be readily elevated to an inoperative position.

Further objects and advantages of the invention will become apparent from the following description and claims, and from the accompanying drawings, wherein:

Figure 3 is an elevational enlarged detail view, partly in longitudinal cross-section, showing the arrangement of the parts of the chopper attachment employed in Figures 1 and 2;

Figure 4 is a cross-sectional view taken on line 4—4 of Figure 3;

Figure 5 is an enlarged, cross-sectional, detail view taken on line 5—5 of Figure 4;

Figure 6 is a perspective view of one of the chopper arms employed in the chopper attachment of the present invention.

Figure 1:
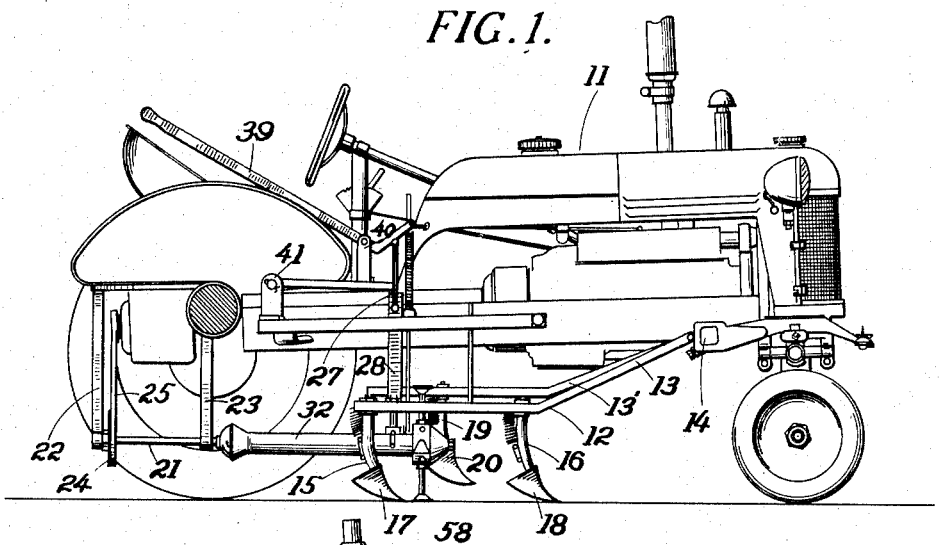
Figure 1 is a longitudinal sectional view of a tractor equipped with a cultivator attachment and provided with a chopper attachment constructed in accordance with the present invention.
Figure 2:
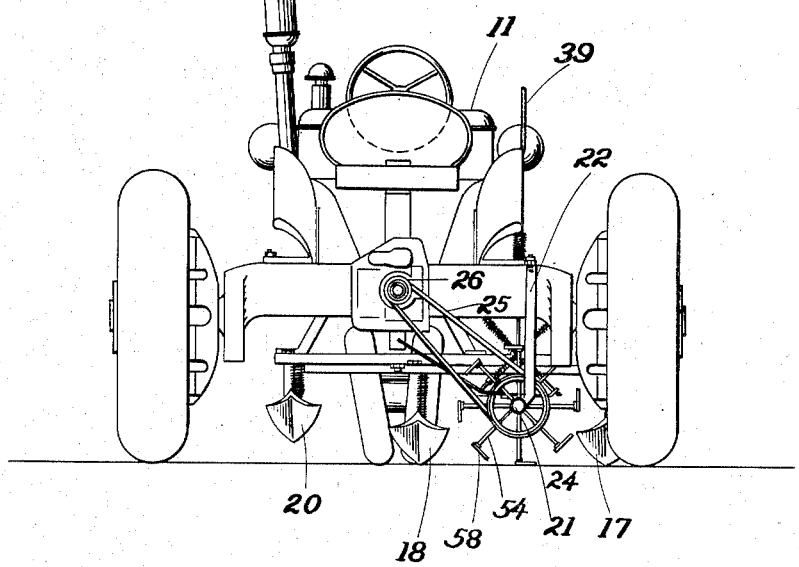
Figure 2 is a rear elevational view of the tractor of Figure 1.

Referring to the drawings, 11 designates a farm tractor provided with a conventional cultivator attachment 12. As shown in Figure 1, the cultivator attachment comprises a frame including side arms, 13, 13' pivotally attached to the tractor frame at 14, the arm 13 having secured thereto the spaced, depending supports 15 and 16 carrying the respective cultivator blades 17 and 18, and the arm 13' having secured thereto the depending support 19 carrying the cultivator blade 20. As shown in Figure 1, the blades are staggered with respect to each other, the arrangement being such that a forward blade 18 loosens and moves dirt away from the plants in a row over which the tractor passes and the rear blade 17 throws fresh dirt back around the plants in said row.

Designated at 21 is a longitudinal shaft rotatably supported on hanger brackets 22 and 23 secured to the rear portion of the tractor frame. Shaft 21 carries a pulley 24 which is coupled by a belt 25 to a pulley 26 carried on the power take-off shaft of the tractor.

Designated at 27 is a cross bar of inverted U-shape, the side arms or legs 28, 28 of the bar diverging downwardly and being secured to the respective cultivator arms 13, 13', as shown in Figures 3 and 4. Cross bar 27 is located in a vertical, transverse plane between the transverse planes of the cultivator blades 17 and 20. Located below cross bar 27 is a bar 29 having the upturned ends 30, 30. Designated at 31, 31 are respective inclined rods, each rod 31 extending loosely and slidably through an upturned end 30 and the opposing side arm 28 of the cross bar 27. The lower ends of the rods 31 are hooked, as shown at 32, 32. Secured to the upper portions of said rods 31 are bearing collars 33, 33. Encircling the rods 31 are respective coiled springs 34, 34, each spring bearing between a collar 35 secured on the lower portion of its associated rod and the opposing side arm 28. Projecting upwardly from the intermediate forward marginal portion of bar 29 is a lug 36, and pivotally connected at 37 to the top end of the lug is an upwardly extending rod 38. The top portion of rod 38 is pivotally connected to the forward end of a bent lever 39, said lever being pivoted at 40 to the top end of an upstanding bracket 41 carrier by the tractor frame.

Secured to the bottom surface of bar 29 at its intermediate portion, and likewise secured to the bottom end of lug 36 is a longitudinally extending sleeve 42 which is formed with a flare 43 at its rear end, the resilient means or springs 34, 34 operatively connected to the sleeve 42 urging the sleeve toward its down movement position. Secured to the periphery of flare 43 is a flexible boot 44 whose rear end 45 is rotatively and sealingly engaged around the forward end portion of shaft 21. Designated at 46 is a shaft which extends axially through sleeve 42 and is connected to shaft 21 by a universal joint 47, housed in flare 43 and boot 44. Secured on the forward end of shaft 46 is a hub member 48, said hub member being formed with a cylindrical axial sleeve portion 49 which is keyed to shaft 46, as by a key 50. The sleeve portion 49 is received within sleeve 42, and a bearing bushing 51 is interposed between the sleeve 42 and sleeve portion 49, as shown in Figure 5. The hub member 48 is formed with an annular flange 52, said flange being formed with a plurality of evenly spaced apertures 53. Secured in said apertures are radial rod elements 52, each rod element having a threaded end 55 received in an aperture 53 and adjustably secured to the flange 52 by nuts 56, 57 threaded on end 55 and engaging opposite sides of the flange. At its outer end, each rod element 54 carries a generally triangular hoe blade 58.

As shown in Figure 1, the transverse plane of the hoe blades 58 is forwardly adjacent the transverse plane of the rear cultivator blade 17.

For close hoeing, hoe elements may be carried by each of the apertures 53. For lighter hoeing, said hoe elements may be carried only by alternate apertures, or may be spaced by a plurality of aperture distances.

In operation, as the tractor advances, the blade 18 loosens and removes dirt from the plants. By means of the handle 39, the sleeve 42 may be lowered or shifted to its down movement position to remove weeds and plants to thin the plants to the proper distance by the chopping action of the hoe elements 58, and the rear cultivator blade 17 throws the fresh dirt back around the remaining plants after the sleeve 42 is again lifted by means of handle 39. The sleeve 42 may be thus lowered to a position wherein the hoe elements 58 pull out the weeds and plants to be removed by their roots, instead of merely cutting the plant stalks.

By employing a suitable number of hoe elements 58 on the hub flange 52 and by suitably regulating the speed of the driving shaft 21 and the speed of the tractor, the device may be employed to cut out any desired length of plants during the cultivating and thinning operations.

By means of the apparatus above described, the dirt is cultivated away from the plants, the plants are thinned, and the dirt is thrown back around the plants, all in one operation, preventing the plants and soil from drying out excessively, due to the short period of exposure of the soil between cultivation and hoeing.

While a specific embodiment of a chopper attachment for use on a farm tractor has been disclosed in the foregoing description, it will be understood that various modifications within the spirit of the invention may occur to those skilled in the art. Therefore, it is

What is claimed is:

1. In a cultivating apparatus for use with a tractor including a frame and a power take off shaft, a pair of arms arranged longitudinally of and below said frame and each arm having one end pivotally connected to said frame, cultivator blades dependingly carried intermediate the respective arms and spaced longitudinally along the respective arms, an upstanding inverted U-shaped crossbar positioned adjacent the other ends of said arms and having the legs secured to said arms, a horizontally disposed open ended sleeve arranged longitudinally of and connected intermediate its ends to said frame for up and down movement and having one of the open ends extending between and spaced from said first and second blades, a first rotatable shaft positioned within said sleeve and having one end projecting through and beyond said one open end of said sleeve, a hub member circumposed about said one open end of said sleeve and connected to the projecting end of said first shaft for rotation therewith, a plurality of hoe elements arranged exteriorly of and in radial relation about said hub member and fixedly carried by the latter, a second rotatable shaft arranged in longitudinal end to end aligned relation with respect to the other end of said first shaft and dependingly supported from said frame having one end connected to the other end of said first shaft for universal pivotal movement, resilient means operatively connected between said crossbar and said sleeve for urging the latter toward its down movement position, means operatively connecting the other end of said second shaft to said power take off shaft, and lifting means connected to said sleeve.

2. In a cultivating apparatus for use with a tractor including a frame and a power take off shaft, a pair of arms arranged longitudinally of and below said frame and each arm having one end pivotally connected to said frame, cultivator blades dependingly carried intermediate the respective arms and spaced longitudinally along the respective arms, an upstanding inverted U-shaped crossbar positioned adjacent the other ends of said arms and having the legs secured to said arms, a horizontally disposed open ended sleeve arranged longitudinally of and connected intermediate its ends to said frame for up and down movement and having one of the open ends extending between and spaced from said first and second blades, a first rotatable shaft positioned within said sleeve and having one end projecting through and beyond one open end of said sleeve, a hub member circumposed about said one open end of said sleeve and connected to the projecting end of said first shaft for rotation therewith, a plurality of hoe elements arranged exteriorly of and fixedly carried by the latter, a second rotatable shaft arranged in longitudinal end to end aligned relation with respect to the other end of said first shaft and dependingly supported from said frame and having one end connected to the other end of said first shaft for universal pivotal movement, flexible boots circumposed about said one end of said second shaft and having one end secured to said second shaft for rotation with the latter named shaft and having the other end secured to the other open end of said sleeve, resilient means operatively connected between said crossbar and said sleeve for urging the latter toward its down movement position, hand operable means operatively connected to said sleeve for effecting the down movement of the latter, means operatively connecting the other end of said second shaft to said power take off shaft, and lifting means connected to said sleeve.

References Cited in the file of this patent

UNITED STATES PATENTS

| Number | Name | Date |
|---|---|---|
| 1,606,468 | Fitts | Nov. 9, 1926 |
| 1,701,137 | Buchwald | Feb. 5, 1929 |
| 1,718,818 | Hanson | June 25, 1929 |
| 2,182,157 | McDermott | Dec. 5, 1939 |